United States Patent
Fox et al.

(10) Patent No.: US 11,368,305 B2
(45) Date of Patent: Jun. 21, 2022

(54) HARDWARE SECURITY MODULE EXTENSION

(71) Applicant: MASTERCARD TECHNOLOGIES CANADA ULC, Vancouver (CA)

(72) Inventors: Justin Fox, Pitt Meadows (CA); Marc Grimson, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 46 days.

(21) Appl. No.: 16/871,371

(22) Filed: May 11, 2020

(65) Prior Publication Data

US 2021/0351928 A1 Nov. 11, 2021

(51) Int. Cl.
*H04L 9/32* (2006.01)
*G06F 21/60* (2013.01)
*H04L 9/08* (2006.01)

(52) U.S. Cl.
CPC ........... *H04L 9/321* (2013.01); *G06F 21/602* (2013.01); *H04L 9/0877* (2013.01); *H04L 9/0891* (2013.01); *H04L 9/0897* (2013.01)

(58) Field of Classification Search
CPC ..... H04L 9/321; H04L 9/0877; H04L 9/0891; G06F 21/602
See application file for complete search history.

(56) References Cited

U.S. PATENT DOCUMENTS

| | | |
|---|---|---|
| 2008/0181399 A1 | 7/2008 | Weise et al. |
| 2009/0300312 A1 | 12/2009 | Handschuh et al. |
| 2016/0283723 A1* | 9/2016 | Roth ................... H04L 63/1416 |
| 2018/0089467 A1 | 3/2018 | Pedersen et al. |

FOREIGN PATENT DOCUMENTS

WO 2019/033193 A1 2/2019

OTHER PUBLICATIONS

International Search Report and Written Opinion for Application No. PCT/CA2021/050531 dated Jun. 25, 2021 (9 pages).

* cited by examiner

*Primary Examiner* — Ayoub Alata
(74) *Attorney, Agent, or Firm* — Michael Best & Friedrich LLP

(57) ABSTRACT

Systems and methods for providing a hardware security module extension having support for custom cryptographic operations. One system includes an application execution server providing an application execution environment. The application execution server is configured to receive a cryptographic request associated with a custom cryptographic operation and access key data from a hardware security module in response to receiving the cryptographic request. The application execution server is also configured to execute, within the application execution environment, the custom cryptographic operation against the key data from the hardware security module and transmit a response to the cryptographic request.

19 Claims, 4 Drawing Sheets

HARDWARE SECURITY MODULE EXTENSION

FIELD

Embodiments described herein relate to a hardware security module extension and, more particularly, to a hardware security module extension that supports additional or custom cryptographic operations in a distributed computing environment.

BACKGROUND

A cryptographic operation is something generally performed in the course of executing a cryptographic algorithm and may, themselves, be an algorithmic subset of the larger cryptographic algorithm. An organization may use a customized cryptographic operation, an extended cryptographic operation, a unique padding technique, or a combination thereof to leverage a cloud environment. However, a hardware security module ("HSM") available from a cloud service provider, such as Gemalto, generally provides a limited set of supported cryptographic operations. Additionally, an HSM provided by a cloud service provider generally does not support customization of a tamper resistant code execution environment, modification of the set of supported cryptographic operations with custom extensions, or a combination thereof. In other words, an organization using a customized or extended cryptographic operation generally cannot implement that customized or extended cryptographic operation with an HSM provided by a cloud service provider.

SUMMARY

To solve these and other problems, embodiments described herein provide methods and systems for providing a hardware security module extension ("HSM-E"). The HSM-E provides an interface to supported cryptographic operations or algorithms by implementing a code execution environment with support for additional or custom cryptographic operations. The HSM-E may use key material of data provided by an underlying hardware security module runtime environment. In other words, the HSM-E may extend a common cloud hardware security module such that additional rulesets, configurations, or a combination thereof are enabled and supported without compromising the security or privacy of secure data, such as customer data or financial data.

Accordingly, the HSM-E may enable a software solution to leverage a hardware security module with a verifiable code execution environment through a mechanism that is global-scale, self-healing (for example, automatic recovery of a computer environment or application service), and auto-scaling with enhanced availability.

One embodiment provides a system for providing a hardware security module extension having support for custom cryptographic operations. The system includes an application execution server providing an application execution environment. The application execution server is configured to receive a cryptographic request associated with a custom cryptographic operation and access key data from a hardware security module in response to receiving the cryptographic request. The application execution server is also configured to execute, within the application execution environment, the custom cryptographic operation against the key data from the hardware security module and transmit a response to the cryptographic request.

Another embodiment provides a method for providing a hardware security module extension having support for custom cryptographic operations. The method includes receiving, at an application execution environment, a cryptographic request associated with a custom cryptographic operation. The method also includes accessing key data from a hardware security module. The method also includes executing, within the application execution environment, the custom cryptographic operation against the key data from the hardware security module, where the custom cryptographic operation is not a supported operation of the hardware security module. The method also includes transmitting a response to the cryptographic request.

Yet another embodiment provides a non-transitory, computer-readable medium storing instructions that, when executed by an electronic processor, perform a set of functions. The set of functions includes receiving, at an application execution environment, a plurality of cryptographic requests. The set of functions also includes accessing key data from a hardware security module. The set of functions also includes executing, within the application execution environment, at least one custom cryptographic operation against the key data from the hardware security module, where that at least one custom cryptographic operation is associated with one or more of the plurality of cryptographic requests. The set of functions also includes transmitting a response based on the execution of the at least one custom cryptographic operation.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

Figure 1:
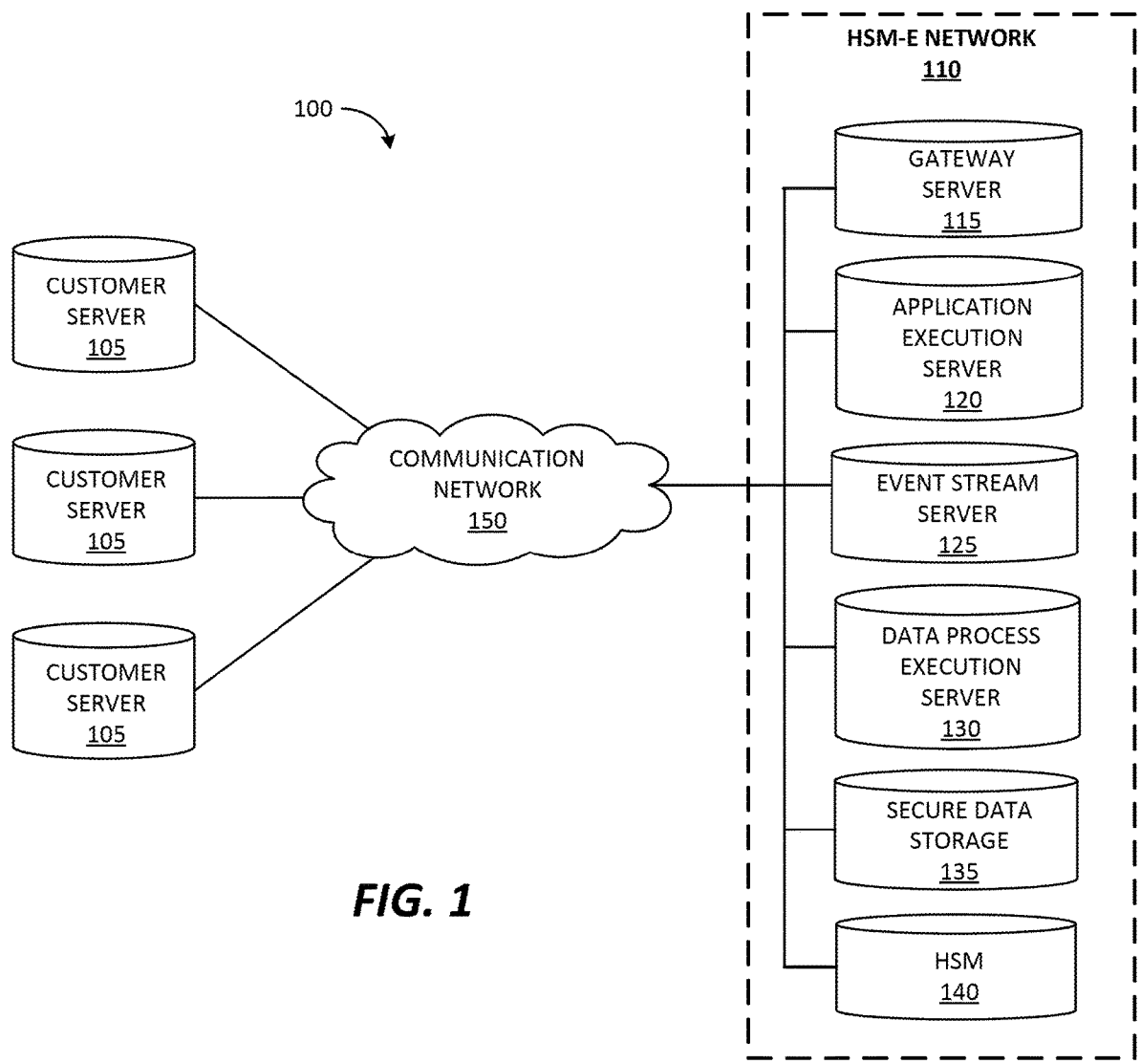
FIG. 1 is a block diagram of a system for providing a hardware security module extension according to some embodiments.

FIG. 1 is a block diagram of a system 100 for providing a hardware security module extension having support for additional or custom cryptographic operations according to some embodiments. In the example shown, the system 100 includes a plurality of customer servers 105 (referred to herein collectively as "the customer servers 105" and individually as "the customer server 105") and a hardware security module extension ("HSM-E") network 110. In the illustrated example, the HSM-E network 110 includes a gateway server 115, an application execution server 120, an event stream server 125, a data process execution server 130, a secure data storage 135, and an HSM 140. In some embodiments, the system 100 includes fewer, additional, or different components than illustrated in FIG. 1. For example, the system 100 may include a different number of customer servers and the three customer servers 105 included in FIG. 1 are purely for illustrative purposes.

The customer servers 105 and the HSM-E network 110 (including the gateway server 115, the application execution server 120, the event stream server 125, the data process execution server 130, the HSM 140, and the secure data storage 135) are communicatively coupled via a communication network 150. The communication network 150 is an electronic communications network including wireless and wired connections. Portions of the communication network 150 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other as compared to communicating through the communication network 150. For example, in some embodiments, the gateway server 115, the application execution server 120, the event stream server 125, the data process execution server 130, the secure data storage 135, and the HSM 140 communicate directly with each other over one or more wired communication lines or buses. Also, in some embodiments, the components of the system 100 communicate through one or more intermediary devices not illustrated in FIG. 1.

Figure 2:
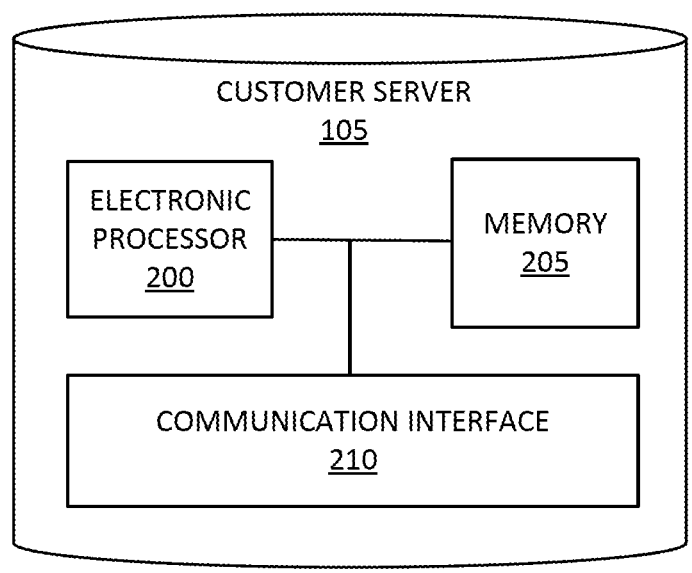
FIG. 2 is a block diagram of a customer server of the system of FIG. 1 according to some embodiments.

The customer server 105 may be a computing device and may include a desktop computer, a terminal, a workstation, a laptop computer, a tablet computer, or the like. As illustrated in FIG. 2, the customer server 105 includes an electronic processor 200 (for example, a microprocessor, an application-specific integrated circuit, or another suitable electronic device for processing data), a memory 205 (for example, a non-transitory computer-readable medium or another suitable memory device), and a communication interface 210. The electronic processor 200, the memory 205, and the communication interface 210 communicate wirelessly, over one or more communication lines or buses, or a combination thereof. The customer server 105 may include additional, fewer, or different components than those illustrated in FIG. 2 in various configurations. For example, although not illustrated, the customer server 105 may include a human-machine interface including one or more input devices, one or more output devices, or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The customer server 105 may provide an application (or service) to a user (or organization). The user (or organization) may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the HSM-E network 110 as part of providing a cloud-based service to a user using a user device (not shown). Alternatively or in addition, the customer server 105 may be a user device used directly by a user to interact with the HSM-E network 110. In some embodiments, the customer server 105 interacts with the HSM-E network 110 (via, for example, the communication network 150) to leverage or access cryptographic operations or algorithms supported by the HSM-E network 110. Accordingly, the HSM-E network 110 generally provides an interface to one or more supported cryptographic algorithms by implementing (or providing) a code execution environment with support for additional or custom cryptographic operations using key material (or data) provided by an underlying hardware security module runtime environment. In some embodiments, the HSM-E network 110 implements a secure environment where there is no Internet connection, no publically routable addresses, and the like.

As noted above and illustrated in FIG. 1, the HSM-E network 110 includes the gateway server 115, the application execution server 120, the event stream server 125, the data process execution server 130, the secure data storage 135, and the HSM 140 (referred to herein collectively as "the one or more components of the HSM-E network 110"). However, in some embodiments, the HSM-E network 110 includes additional, fewer, or different components than illustrated in FIG. 1 in various configurations. For example, the HSM-E network 110 may include multiple gateway servers 115, multiple application execution servers 120, multiple event stream servers 125, multiple data process servers 130, multiple HSMs 140, and multiple secure data storages 135.

Alternatively or in addition, in some embodiments, the functionality (or a portion thereof) described as being provided by the HSM-E network 110, one or more components of the HSM-E network 110, or a combination thereof may be distributed among multiple networks, devices, servers, and the like. Alternatively or in addition, in some embodiments, the functionality (or a portion thereof) described as being provided by the HSM-E network 110, one or more components of the HSM-E network 110, or a combination thereof may be combined into a single device or server. For example, in some embodiments, the HSM-E network 110 may include a single device or server (for example, a HSM-E server) configured to provide the functionality described herein as being provided by the one or more components of the HSM-E network 110.

Although not illustrated, the gateway server 115, the application execution server 120, the event stream server 125, the data process execution server 130, the secure data storage 135, and the HSM 140 may include similar components as the customer server 105 (an electronic processor, a memory, and a communication interface). However, in some embodiments, the gateway server 115, the application execution server 120, the event stream server 125, the data process execution server 130, the secure data storage 135, and the HSM 140 includes additional, fewer, or different components.

The gateway server 115 receives one or more cryptographic requests from the customer servers 105 through a private connection or a public connection. In some embodiments, the gateway server 115 functions as an application programming interface (API) gateway. In response to receiving a cryptographic request, the gateway server 115 routes the cryptographic request to the application execution server 120. The application execution server 120 provides an application execution environment (for example, a tamper resistant application execution environment) for the HSM-E network 110. The application execution server 120, within the application execution environment, may execute (or run) a custom cryptographic operation against the HSM 140, the secure data storage 135, or a combination thereof. For example, the application execution server 120 may execute a custom cryptographic operation based on key material (or data) from or against the HSM 140. The HSM 140 stores and manages key material or data (for example, one or more digital keys). Alternatively or in addition, in some embodiments, the HSM 140 provides or performs one or more cryptographic operations. A cryptographic operation may include, for example, key management, key exchange, encryption, and the like. The secure data storage 135 may be a database or other suitable storage device for storing secure or sensitive data, such as customer data or financial data. The event stream server 125 provides event stream technology or functionality including, for example, event aggregation, one or more event notification and queue components, and the like. The data process execution server 130 provides a data process execution environment. The data process execution server 130, within the data process execution environment, processes one or more cryptographic requests using the event stream server 125. For example, the data process execution server 130 may process a batch of cryptographic requests against the HSM 140, the secure data storage 135, or a combination thereof. In some embodiments, the data process execution server 130 processes a cryptographic request by performing an action associated with the cryptographic request.

Figure 3:
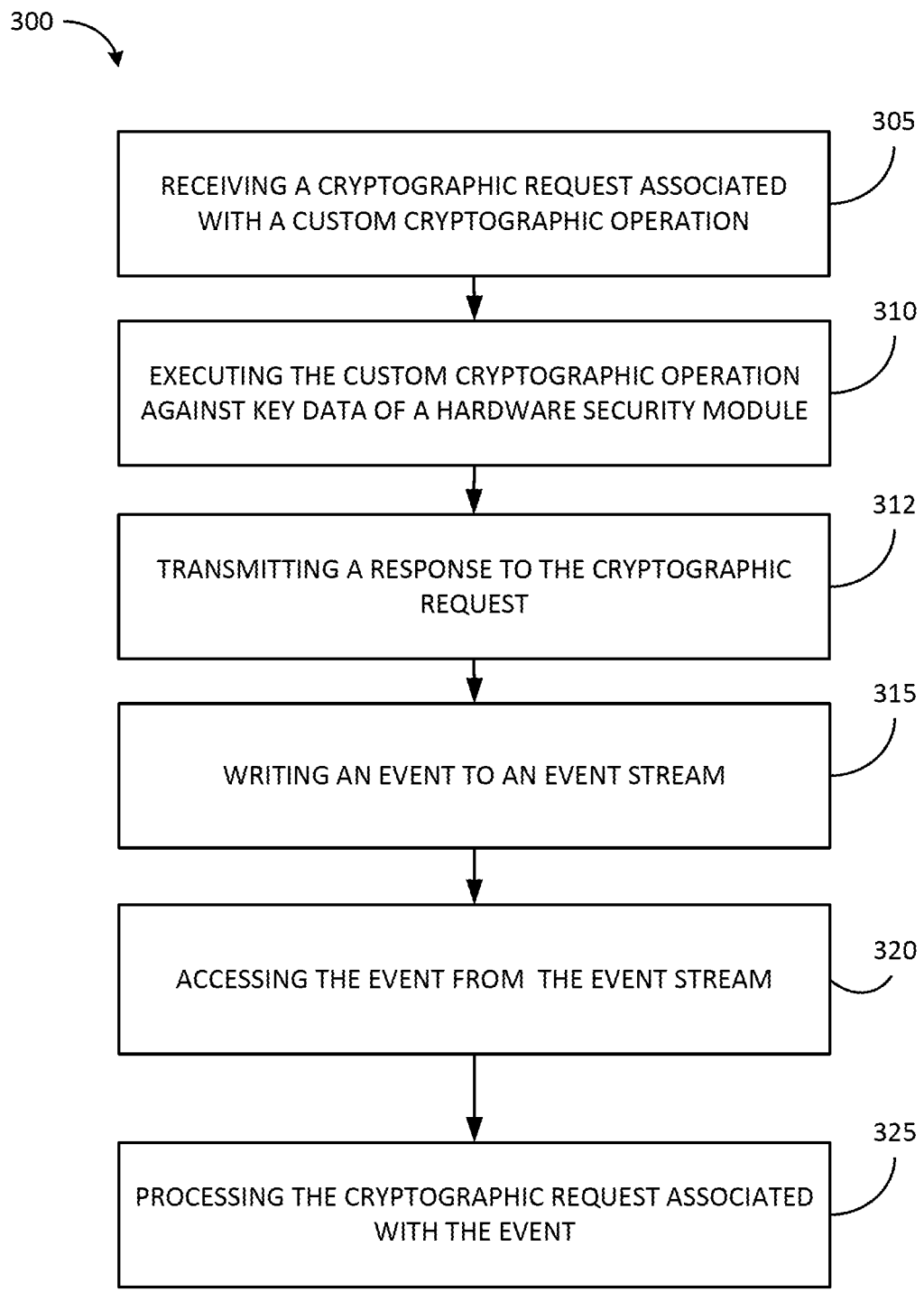
FIG. 3 is a flow chart of a method for providing a hardware security module extension using the system of FIG. 1 according to some embodiments.
Figure 4:
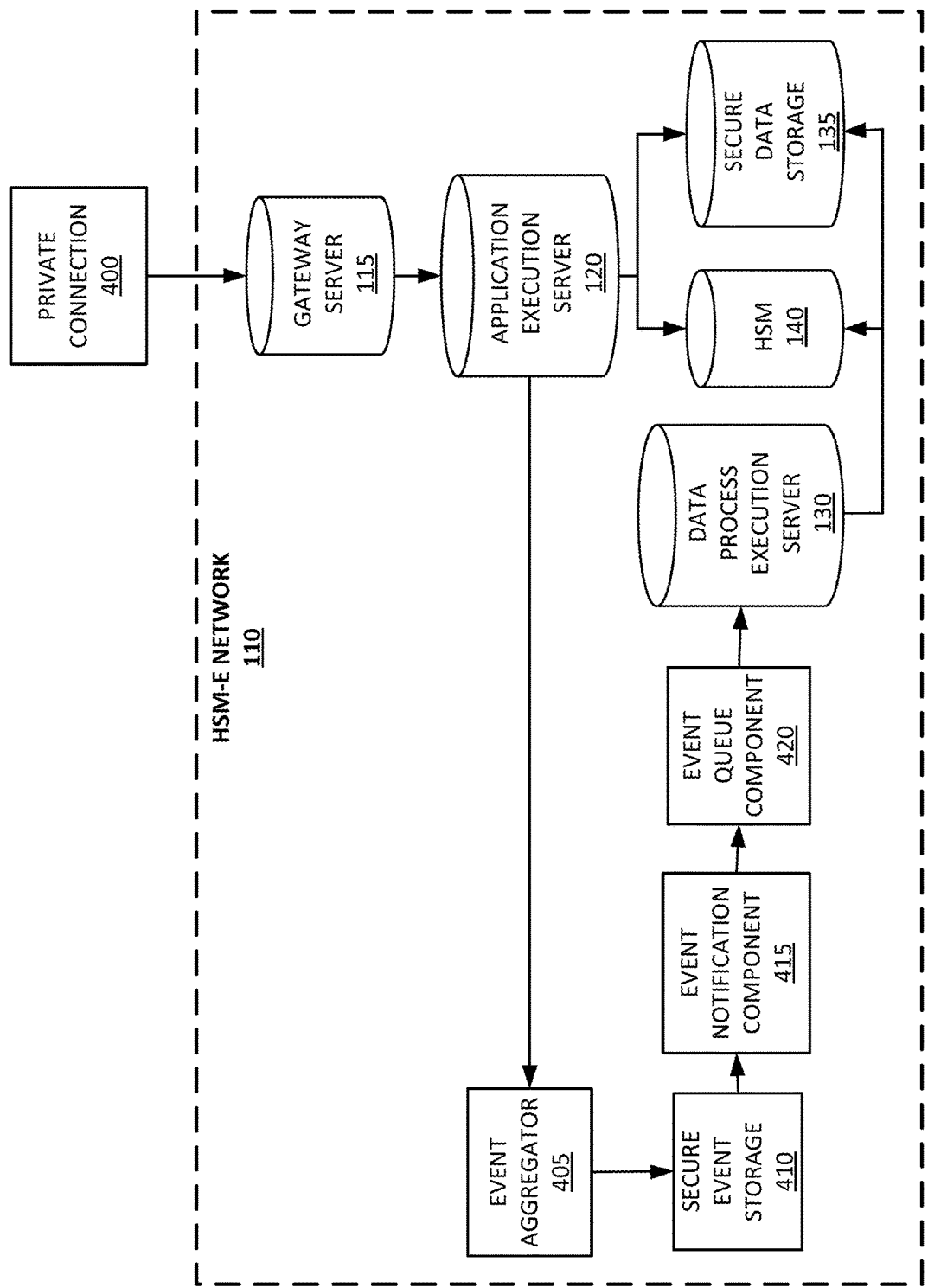
FIG. 4 is a block diagram illustrating an exemplary workflow of a hardware security module extension according to some embodiments.

FIG. 3 is a flowchart illustrating a method 300 for providing a hardware security module extension using the system 100 of FIG. 1 according to some embodiments. The method 300 of FIG. 3 will be described with reference to FIG. 4. FIG. 4 is a block diagram illustrating an exemplary workflow with respect to the HSM-E network 110 of FIG. 1.

As seen in FIG. 3, the method 300 includes receiving a cryptographic request (at block 305). The cryptographic request may be received from a customer server 105. In some embodiments, the cryptographic request is received through a private connection (or private network) between the HSM-E network 110 (for example, the gateway server 115) and a customer server 105. In other embodiments, the cryptographic request is received through a public connection between the HSM-E network 110 (for example, the gateway server 115) and a customer server 105. As noted above, a user (or organization) may implement a customized cryptographic operation, an extended cryptographic operation, a unique padding technique, or a combination thereof to leverage cloud environments. Accordingly, in some embodiments, the cryptographic request is associated with a customized cryptographic operation, an extended cryptographic operation, a unique padding technique, or a combination thereof. In some embodiments, the HSM-E network 110 receives multiple cryptographic requests. The HSM-E network 110 may receive multiple cryptographic requests from different networks or customer servers 105, the same networks or customer servers 105, or a combination thereof. For example, the HSM-E network 110 may receive a first cryptographic request from a first customer server and a second cryptographic request from a second customer server, where the first customer server and the second customer server may be part of the same or different networks.

As illustrated in FIG. 4, in some embodiments, the cryptographic request is received by the gateway server 115 from a private connection 400. As noted above, in some embodiments, the gateway server 115 functions as an application programming interface (API) gateway. In some embodiments, the gateway server 115 functions as an API checkpoint that validates or verifies a cryptographic request before routing the cryptographic request. For example, as seen in FIG. 4, the gateway server 115 may route the cryptographic request to the application execution server 120.

Accordingly, in some embodiments, in response to receiving one or more cryptographic requests, the application execution server 120 executes, within the application execution environment, at least one custom cryptographic operation against key data of the hardware security module 140 (at block 310). For example, in some embodiments, the application execution server 120 accesses or interacts with the HSM 140, the secure data storage 135, or a combination thereof to perform the customized cryptographic operation. In some embodiments, the application execution server 120 executes (or runs) a custom cryptographic operation based off of key material (or data) from or against the HSM 140.

As an example, a customer request (e.g., a cryptographic request) may be received by the application execution server 120. The application execution server 120 may interact with the HSM 140. An application process of the application execution server 120 may be created through an upload process that returns a checksum. The checksum may be verified prior to the application process being executed or provided with computer capacity. The application execution server 120 may retrieve key material protected by a FIPS 140-2 or FIPS 140-3 compliant HSM appliance (e.g., the HSM 140). The tamper resistant application process of the application execution server 120 is leveraged to perform custom operations not directly supported by the underlying HSM device (e.g., the HSM 140). A custom operation may include, for example, padding the plain text data, encrypting the data, splitting the encrypted data, padding the split crypto-data, further encrypting the data, joining the data structures, and the like.

As seen in FIG. 3, the method 300 also includes transmitting a response to each of the processed cryptographic requests (at block 312). In some embodiments, the response is transmitted from the HSM-E network 110 to the customer server 105 associated with the processed cryptographic request. In some embodiments, the HSM-E network 110 (for example, the application execution server 120) enables access to the secure data storage 135 based on, for example, the processing of the cryptographic request against the key data from the HSM 140. The HSM-E network 110 (for example, the application execution server 120) may enable access to the secure data storage 135 by reading data from the secure data storage 135. In such embodiments, the response transmitted from the HSM-E network 110 includes the data read from the secure data storage 135. Alternatively or in addition, the HSM-E network 110 (for example, the application execution server 120) may enable access to the secure data storage 135 by writing data to the secure data storage 135. In some embodiments, the HSM-E network 110 (for example, the application execution server 120) may restrict access to the secure data storage 135 based on, for example, the processing of the cryptographic request against the key data from the hardware security module 140.

In some embodiments, one or more events are written to an event stream (at block 315). For example, as illustrated in FIG. 4, the HSM-E network 110 may include an event aggregator 405, a secure event storage 410, an event notification component 415, and an event queue component 420 as part of an event stream. However, in some embodiments, the event stream may include additional, fewer, or different components than illustrated in FIG. 4. In some embodiments, the event stream is provided by the event stream server 125. In other words, in some embodiments, the event stream server 125 implements the event aggregator 405, the secure event storage 410, the event notification component 415, and the event queue component 420.

In some embodiments, the application execution server 120 writes one or more events to the event stream. Alternatively or in addition, in some embodiments, in response to receiving a cryptographic request, the gateway server 115 may write one or more events to the event stream directly. In some embodiments, the application execution server 120, the gateway server 115, or a combination thereof writes one or more events to the event aggregator 405, which passes the one or more events to the secure event storage 410 for secure storage. An event written to the secure event storage 410 of the event stream may be associated with a cryptographic request. In response to an event being stored in the secure event storage 410, the event notification component 415 is triggered to transmit one or more notifications to the event queue component 420.

The data process execution server 130 may access one or more events from the data stream (at block 320). In some embodiments, the data process execution server 130 interacts with the event stream server 125 to access the one or more events. In some embodiments, the data process execution server 130 accesses the one or more events in response to the transmission of and receipt of a notification at the event queue component 420. For example, as illustrated in FIG. 4, the data process execution server 130 may interact with the event queue component 420 to access the one or more events. In other words, in some embodiments, the receipt of a notification at the event queue component 420 serves as a trigger for the data process execution server 130 to access the one or more events.

After accessing the one or more events from the event queue component 420, the data process execution server 130 processes, within the data process execution environment, a cryptographic request associated with the one or more events (at block 325). In some embodiments, the data process execution server 130 processes a cryptographic request by performing an action associated with the cryptographic request. An action may include, for example, an administrative action, a logging action, a non-real-time action, and the like. For example, an action may include creation of key data, rotation of key data, deletion of key data, and specification of a key permission.

In some embodiments, the event stream, the data process execution server 130, or a combination thereof provides logging functionality. For example, in such embodiments, all cryptographic requests received by the gateway server 115 are recorded (or logged) through the event aggregator 405. The cryptographic requests may be recorded in auditable format. Alternatively or in addition, in some embodiments, the event stream, the data process execution server 130, or a combination thereof provides functionality for (or handles) non-real-time actions or activities, such as key deletion, key creation, key rotation, and the like.

As seen in FIG. 4, the data process execution server 130 may output a result from performing the action to the hardware security module 140, the secure data storage 135, or a combination thereof. For example, when the data process execution server 130 is configured to provide logging functionality, the data process execution server 130 may output the result to the secure data storage 135, where the result includes an update to a cryptographic request log stored in the secure data storage 135. As another example, when the data process execution server 130 is configured to provide functionality for non-real-time actions or administrative actions, the data process execution server 130 may output the result to the hardware security module 140, where the result includes an update to the key data of the hardware security module 140. An update to the key data may include, for example, creation of key data, rotation of key data, deletion of key data, and specification of a key permission.

Accordingly, in some embodiments, the HSM-E network 110 provides a private interface that uses a type of network encapsulation that enables one service provider (i.e., a service provider of the HSM-E network 110 or a portion thereof) to service many consuming applications from different customers (i.e., the customer servers 105) with strong authentication and identification. The private interface may provide connectivity to an application programming interface (API) that enables a customer to make cryptographic requests. A verifiable code execution environment (i.e., the HSM-E network 110) filters and transforms cryptographic operations to be compatible with customized or extended cryptographic operations or unusual padding techniques while leveraging one or more compliant hardware security modules. In some embodiments, the HSM-E network 110 handles encrypted data that utilizes a second layer of encryption that uses, for example, envelop encryption with an organizational encryption key with advanced authentication data generated by a hardware security module (for example, the hardware security module 140) to secure encrypted data objects at rest.

In some embodiments, the HSM-E network 110 supports asynchronous requests for limited administrative operations that do not require an immediate response through an event stream mechanism that receives cryptographic requests in the code execution environment and pushes an event to the event stream and from there to a secure event storage, such as the secure event storage 410. Object writes to the secure event storage 410 may trigger notifications to queues (for example, notifications from the event notification component 415 to the event queue component 420). Additionally, in some embodiments, the HSM-E network 110 includes additional data processing code execution environments (for example, via multiple data process execution servers 130) that may process requests from the event queue component 420 in batches (for example, two or more cryptographic requests) against the HSM 140, the secure data storage 135, or a combination thereof. Alternatively or in addition, in some embodiments, the HSM-E network 110 captures every cryptographic request and configuration change within the environment out-of-band to prevent tampering.

Thus, the embodiments described herein provide, among other things, methods and systems providing a hardware security module extension having support for additional or custom cryptographic operations. The embodiments described herein may enable an organization to migrate custom hardware security module use cases to a system designed for cloud service provider environments. Cloud service provider environments are able to scale without the same limits of traditional data centers, which may (through implementation of the embodiments described herein) result in a globally secured footprint. Alternatively or in addition, the embodiments described herein enable migration to external data centers that are managed by cloud service providers. The embodiments described herein enable the migration of custom or extended cryptographic operations to cloud environments while meeting rigorous compliance standards. Various features and advantages of the invention are set forth in the following claims.

What is claimed is:

1. A system for providing a hardware security module extension having support for custom cryptographic operations, the system comprising:
   an application execution server providing an application execution environment and part of a hardware security module extension (HSM-E) network that is operating as a cloud service, the application execution server configured to
   receive a cryptographic request associated with a custom cryptographic operation,
   access key data from a hardware security module in response to receiving the cryptographic request,
   execute, within the application execution environment, the custom cryptographic operation against the key data from the hardware security module, wherein the custom cryptographic operation is not a supported operation of the hardware security module and
   transmit a response to the cryptographic request.

2. The system of claim 1, wherein the application execution server is configured to receive the cryptographic request from a private network.

3. The system of claim 1, wherein the custom cryptographic operation includes at least one selected from a group consisting of padding plaintext data, encrypting data, splitting encrypted data, padding split encrypted data, further encrypting encrypted data, and joining data structures.

4. The system of claim 1, further comprising:
   an event stream server providing an event stream, the event stream server configured to
   receive an event associated with the cryptographic request,
   store the event in a secure event storage, and
   trigger a notification associated with the event to an event queue.

5. The system of claim 1, further comprising:
   a data process execution server providing a data process execution environment, the data process execution server configured to
   access an event associated with the cryptographic request from an event queue,
   perform an action based on the cryptographic request, and
   output a result from performing the action.

6. The system of claim 5, wherein the action includes at least one selected from a group consisting of creation of key data, rotation of key data, deletion of key data, and specification of a key permission.

7. The system of claim 5, wherein the data process execution server is configured to output the result to the hardware security module, the result including an update to the key data of the hardware security module.

8. The system of claim 5, wherein the data process execution server is configured to output the result to a secure data storage, the result including an update to a cryptographic request log.

9. The system of claim 5, wherein the data process execution server does not have access to the key data of the hardware security module.

10. The system of claim 1, wherein the application execution server is configured to receive the cryptographic request from a customer server through an application programming interface gateway.

11. The system of claim 1, further comprising:
    an application programming interface gateway configured to
    receive the cryptographic request,
    validate the cryptographic request, and
    route the cryptographic request to the application execution server.

12. A method for providing a hardware security module extension having support for custom cryptographic operations, the method comprising:
    receiving, at a server providing an application execution environment that is part of a hardware security module extension (HSM-E) network operating as a cloud service, a cryptographic request associated with a custom cryptographic operation;
    accessing key data from a hardware security module;
    executing, within the application execution environment, the custom cryptographic operation against the key data from the hardware security module, wherein the custom cryptographic operation is not a supported operation of the hardware security module; and
    transmitting a response to the cryptographic request.

13. The method of claim 12, wherein receiving the cryptographic request includes receiving the cryptographic request at an application programming interface gateway and routing, with the application programming interface gateway, the cryptographic request to the server.

14. The method of claim 13, further comprising:
validating, with the application programming interface gateway, the cryptographic request prior to routing the cryptographic request to the server.

15. The method of claim 12, further comprising:
enabling access to a secure data storage based on the execution of the custom cryptographic operation against the key data from the hardware security module,
wherein enabling access to the secure data storage includes at least one selected from a group consisting of reading data from the secure data storage and writing data to the secure data storage.

16. The method of claim 12, further comprising:
restricting access to a secure data storage based on the execution of the custom cryptographic operation against the key data from the hardware security module.

17. A non-transitory, computer-readable medium storing instructions that, when executed by an electronic processor of a server, perform a set of functions, the set of functions comprising:
receiving, at an application execution environment that is part of a hardware security module extension (HSM-E) network operating as a cloud service, a plurality of cryptographic requests;
accessing key data from a hardware security module;
executing, within the application execution environment, at least one custom cryptographic operation against the key data from the hardware security module, wherein that at least one custom cryptographic operation is associated with one or more of the plurality of cryptographic requests and wherein the at least one custom cryptographic operation is not a supported operation of the hardware security module; and
transmitting a response based on the execution of the at least on custom cryptographic operation.

18. The computer-readable medium of claim 17, wherein the set of functions further comprises:
writing a plurality of events to a secure event storage of an event stream, wherein each of the plurality of events is associated with one of the plurality of cryptographic requests;
accessing, from the event stream, two or more events included in the plurality of events;
for each of the two or more events, performing, within a data process execution environment, an action associated with each of the two or more events using the hardware security module; and
outputting a result from performing the action for each of the two or more events.

19. The computer-readable medium of claim 17, wherein receiving the plurality of cryptographic requests includes receiving the plurality of cryptographic requests from different private networks.

* * * * *